United States Patent
Phelps

(10) Patent No.: US 12,078,073 B1
(45) Date of Patent: Sep. 3, 2024

(54) PHONIC WHEEL FOR TURBINE ENGINE BEARING COMPARTMENT

(71) Applicant: Raytheon Technologies Corporation, Farmington, CT (US)

(72) Inventor: Joseph B. Phelps, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/202,754

(22) Filed: May 26, 2023

(51) Int. Cl.
    F01D 21/00 (2006.01)
    F02C 7/06 (2006.01)
    G01P 3/481 (2006.01)

(52) U.S. Cl.
    CPC ............. F01D 21/003 (2013.01); F02C 7/06 (2013.01); G01P 3/481 (2013.01); F05D 2270/304 (2013.01); F05D 2270/80 (2013.01)

(58) Field of Classification Search
    CPC .......... F01D 21/003; F02C 7/06; G01P 3/481; F05D 2270/304; F05D 2270/80
    See application file for complete search history.

(56) References Cited

U.S. PATENT DOCUMENTS

| | | | |
|---|---|---|---|
| 9,316,231 B2 * | 4/2016 | Simms | F04D 27/0292 |
| 9,708,926 B2 | 7/2017 | Curlier | |
| 10,168,236 B2 | 1/2019 | Curlier | |
| 10,174,629 B1 | 1/2019 | Valva | |
| 2017/0115320 A1 | 4/2017 | Turner | |
| 2020/0200036 A1 | 6/2020 | Petersen | |
| 2020/0200788 A1 | 6/2020 | Davies | |
| 2022/0049625 A1 | 2/2022 | Siw | |

FOREIGN PATENT DOCUMENTS

CN 102607751 B 6/2014

OTHER PUBLICATIONS

EP search report for EP24166454.9 dated May 23, 2024.

* cited by examiner

*Primary Examiner* — Brandon D Lee
(74) *Attorney, Agent, or Firm* — Getz Balich LLC

(57) ABSTRACT

An assembly is provided for a turbine engine. This turbine engine assembly includes a rotating assembly and a sensor. The rotating assembly is configured to rotate about an axis. The rotating assembly includes an engine shaft, a phonic wheel and a lubricant scoop. The phonic wheel is mounted onto the engine shaft. The phonic wheel includes an outer surface and a plurality of apertures arranged circumferentially about the axis. Each of the apertures projects at least partially radially into the phonic wheel from the outer surface. The lubricant scoop is radially outboard of and axially overlaps the outer surface. The sensor is configured to measure fluctuations in a magnetic field induced by the phonic wheel during rotation of the rotating assembly about the axis.

20 Claims, 6 Drawing Sheets

PHONIC WHEEL FOR TURBINE ENGINE BEARING COMPARTMENT

GOVERNMENT LICENSE RIGHTS

This invention was made with Government support. The Government has certain rights in this invention.

BACKGROUND OF THE DISCLOSURE

1. Technical Field

This disclosure relates generally to a turbine engine and, more particularly, to a sensor system for the turbine engine.

2. Background Information

A gas turbine engine may include a sensor system configured to measure a rotational velocity of a rotating element such as an engine shaft. Various type of sensor systems are known in the art, including those which utilize a phonic wheel to induce fluctuations in a magnetic field. While these known sensor systems have various benefits, there is still room in the art for improvement.

SUMMARY OF THE DISCLOSURE

According to an aspect of the present disclosure, an assembly is provided for a turbine engine. This turbine engine assembly includes a rotating assembly and a sensor. The rotating assembly is configured to rotate about an axis. The rotating assembly includes an engine shaft, a phonic wheel and a lubricant scoop. The phonic wheel is mounted onto the engine shaft. The phonic wheel includes an outer surface and a plurality of apertures arranged circumferentially about the axis. Each of the apertures projects at least partially radially into the phonic wheel from the outer surface. The lubricant scoop is radially outboard of and axially overlaps the outer surface. The sensor is configured to measure fluctuations in a magnetic field induced by the phonic wheel during rotation of the rotating assembly about the axis.

According to another aspect of the present disclosure, another assembly is provided for a turbine engine. This turbine engine assembly includes a rotating assembly and a sensor. The rotating assembly is configured to rotate about an axis. The rotating assembly includes an engine shaft, a phonic wheel and a lubricant scoop integrated into the phonic wheel. The phonic wheel is mounted onto the engine shaft. The phonic wheel includes a plurality of apertures and an annular channel fluidly coupled with the plurality of apertures. The apertures are arranged circumferentially about the axis and form the lubricant scoop and a castellated region of the phonic wheel. Each of the apertures extends radially through the phonic wheel to the annular channel. The annular channel is disposed at a radial inner side of the phonic wheel. The sensor is configured to measure fluctuations in a magnetic field induced by the castellated region of the phonic wheel during rotation of the rotating assembly about the axis.

According to still another aspect of the present disclosure, another assembly is provided for a turbine engine. This turbine engine assembly includes a rotating assembly and a sensor. The rotating assembly is configured to rotate about an axis. The rotating assembly includes an engine shaft, a phonic wheel and a lubricant scoop. The phonic wheel is mounted onto the engine shaft. The phonic wheel includes a plurality of apertures arranged circumferentially about the axis. The apertures provide the phonic wheel with a castellated region. Each of the apertures extends radially through the phonic wheel. The lubricant scoop is radially outboard of and axially overlaps the phonic wheel. The sensor is configured to measure fluctuations in a magnetic field induced by the castellated region of the phonic wheel during rotation of the rotating assembly about the axis.

The phonic wheel may also include a plurality of passages arranged circumferentially about the axis. Each of the passages may extend radially through the phonic wheel to the annular channel. The annular channel may fluidly couple the apertures to the passages.

The lubricant scoop may be configured as or otherwise include a radial lubricant scoop. The rotating assembly may also include an axial lubricant scoop radially outboard of and axially overlapping the phonic wheel. A lubricant collection area may be formed by and radially between the phonic wheel and the axial lubricant scoop.

The turbine engine assembly may also include a sensor system which include the phonic wheel and the sensor. The sensor system may be configured to determine a rotational velocity of the rotating assembly.

The apertures may provide the outer surface with a castellated region. The castellated region may be configured to induce the fluctuations in the magnetic field during the rotation of the rotating assembly about the axis.

A tip of the sensor may be disposed radially outboard of and adjacent the castellated region.

The outer surface may be a cylindrical outer surface.

Each of the apertures may have a lateral width. Each circumferentially neighboring pair of the apertures may be spaced apart by a lateral distance that is equal to or less than the lateral width.

A first of the apertures may be configured as or otherwise include an indentation.

A first of the apertures may be configured as or otherwise include a through-hole.

The lubricant scoop may be configured as or otherwise include an axial lubricant scoop. The apertures may form a radial lubricant scoop in the phonic wheel.

The phonic wheel may also include a channel and a plurality of passages. Each of the apertures may extend radially through the phonic wheel from the outer surface to the channel. The channel may be disposed at a radial inner side of the phonic wheel and may fluidly couple the apertures to the passages. The passages may be arranged circumferentially about the axis. Each of the passages may extend radially out from the channel and through the phonic wheel.

The rotating assembly may also include a scoop body mounted with the engine shaft. The scoop body may include the lubricant scoop. The lubricant scoop may include a gutter disposed at a radial inner side of the scoop body. The gutter may axially overlap and may be disposed radially opposite the outer surface.

The scoop body may be threaded onto the engine shaft.

The engine shaft may include a plurality of passages arranged circumferentially about the axis. Each of the passages may extend axially into the engine shaft from the gutter.

The engine shaft may also include a shoulder. Each of the passages may extend axially through the shoulder. The scoop body may be mounted onto the shoulder.

The rotating assembly may also include a scoop body mounted onto the engine shaft. The scoop body may include the lubricant scoop. The scoop body may be axially abutted against an engagement surface of the engine shaft. The phonic wheel may be axially abutted against the engagement surface of the engine shaft.

The rotating assembly may also include a bladed rotor connected to the engine shaft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
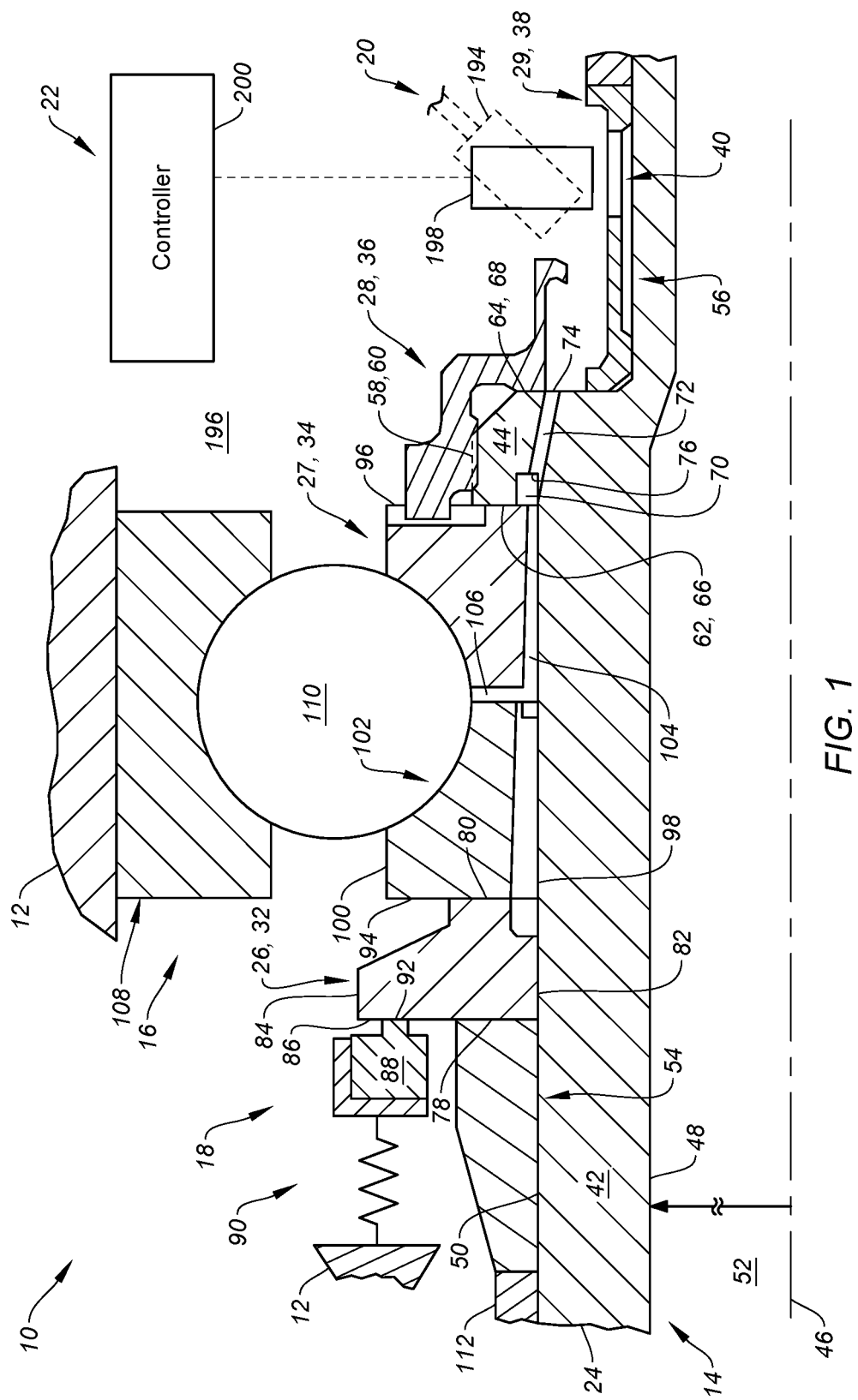
FIG. 1 is a partial side sectional illustration of an assembly for a turbine engine.

FIG. 1 is a partial side sectional illustration of an assembly 10 for a turbine engine. This engine assembly 10 includes a stationary structure 12, a rotating assembly 14 and a bearing 16 rotatably mounting the rotating assembly 14 to the stationary structure 12. The engine assembly 10 also includes a seal assembly 18, a lubrication system 20 and a sensor system 22.

The rotating assembly 14 of FIG. 1 includes an engine shaft 24 and a plurality of engine components 26-29 mounted onto (e.g., fixedly secured to) and rotatable with the engine shaft 24. The first engine component 26 is configured as or otherwise includes a seal land 32 of the seal assembly 18. The second engine component 27 is configured as or otherwise includes an inner race 34 of the bearing 16. The third engine component 28 is configured as or otherwise includes a lubricant scoop body 36; e.g., a lubricant scoop nut. The fourth engine component 29 is configured as or otherwise includes a phonic wheel 38 with an integrated radial lubricant scoop 40. The present disclosure, however, is not limited to the foregoing exemplary arrangement of engine components.

The engine shaft 24 includes a shaft base 42 and a shaft shoulder 44. The engine shaft 24 and its shaft base 42 extend axially along an axis 46, which axis 46 may be an axial centerline and/or a rotational axis of the rotating assembly 14 and its members 24 and 26-29. The shaft base 42 extends radially from a radial inner side 48 of the engine shaft 24 and its shaft base 42 to a radial outer side 50 of the shaft base 42. The shaft base 42 extends circumferentially about (e.g., completely around) the axis 46. The engine shaft 24 and its shaft base 42 may thereby have a full-hoop (e.g., tubular) geometry. Moreover, the shaft base 42 forms an inner bore 52 in the engine shaft 24. This inner bore 52 extends axially within, into or through the engine shaft 24 and its shaft base 42 along the shaft inner side 48.

The shaft base 42 of FIG. 1 and its base outer side 50 have a radial outer mounting region 54 and a radial inner mounting region 56. The outer mounting region 54 is stepped radially outward from the inner mounting region 56.

The shaft shoulder 44 is disposed axially between and separates the outer mounting region 54 and the inner mounting region 56 along the axis 46. The shaft shoulder 44 is connected to (e.g., formed integral with) the shaft base 42. The shaft shoulder 44 may be configured as an annular protrusion such as a flange or a rim. The shaft shoulder 44 of FIG. 1, for example, projects radially out from the shaft base 42 at its base outer side 50 to a distal radial outer side 58 of the shaft shoulder 44. At least a portion or an entirety of the shaft shoulder 44 along the shoulder outer side 58 may be threaded. The shaft shoulder 44 of FIG. 1, for example, includes an outer threaded region 60 at the shoulder outer side 58. The shaft shoulder 44 extends axially along the axis 46 between opposing axial sides 62 and 64 of the shaft shoulder 44.

The shaft shoulder 44 includes plurality of (e.g., annular) engagement surfaces 66 and 68; e.g., face surfaces, contact surfaces, etc. The shoulder first engagement surface 66 is disposed on the shoulder first side 62, for example axially adjacent (e.g., and contiguous with) the outer mounting region 54 of the base outer side 50. The shoulder second engagement surface 68 is disposed on the shoulder second side 64, for example axially adjacent (e.g., and contiguous with) the inner mounting region 56 of the base outer side 50. The shoulder second engagement surface 68 is thereby arranged axially opposite the shoulder first engagement surface 66. The shaft shoulder 44 of FIG. 1 also includes a lubricant channel 70 and a plurality of internal lubricant passages 72.

The shoulder channel 70 is disposed at the shoulder first side 62, and may be radially adjacent the shaft base 42 and its outer mounting region 54. The shoulder channel 70 of FIG. 1, for example, projects axially along the axis 46 into the shaft shoulder 44 from the shoulder first engagement surface 66 to a distal axial end of the shoulder channel 70. The shoulder channel 70 extends radially within the engine shaft 24 between and to opposing radial sides of the shoulder channel 70. The channel inner side may be formed by the shaft base 42. The channel outer side is formed by the shaft shoulder 44. The shoulder channel 70 extends circumferentially about (e.g., completely around) the axis 46 within the engine shaft 24 and its shaft shoulder 44. The shoulder channel 70 may thereby have a full-hoop (e.g., annular) geometry.

The shoulder passages 72 are arranged circumferentially about the axis 46 in an array; e.g., a circular array. Each of the shoulder passages 72 is configured as a through-hole which extends axially through the engine shaft 24 and its shaft shoulder 44. Each shoulder passage 72 of FIG. 1, for example, extends axially (and slightly radially in a radial outward direction away from the axis 46 in FIG. 1) from an inlet 74 into the respective shoulder passage 72 to an outlet 76 from the respective shoulder passage 72. The shoulder passage inlet 74 is disposed at the shoulder second side 64, for example in the shoulder second engagement surface 68. The shoulder passage outlet 76 is disposed at (e.g., on, adjacent or proximate) the shoulder first side 62, for example in the shoulder channel axial end. The shoulder passages 72 are thereby fluidly coupled with the shoulder channel 70, and these elements 70 and 72 provide a lubricant flowpath axially across the shaft shoulder 44.

The seal land 32 extends axially along the axis 46 between and to opposing axial sides 78 and 80 of the seal land 32. The seal land 32 extends radially from a radial inner side 82 of the seal land 32 to a radial outer side 84 of the seal land 32.

The seal land 32 extends circumferentially about (e.g., completely around) the axis 46. The seal land 32 may thereby have a full-hoop (e.g., annular) geometry. The seal land 32 of FIG. 1 includes a (e.g., annular) seal land surface 86 at the seal land first side 78, for example radially adjacent (e.g., contiguous with) the seal land outer side 84.

The seal assembly 18 of FIG. 1 also includes a (e.g., annular) seal element 88 such as a carbon seal element. Briefly, the seal element 88 is mounted to the stationary structure 12 through a seal mounting assembly 90. This seal mounting assembly 90 is configured to push or otherwise bias the seal element 88 axially against the seal land 32 to provide a seal interface between a seal element surface 92 of the seal element 88 and the seal land surface 86. The seal assembly 18 may thereby seal a gap between the stationary structure 12 and the seal land 32.

The inner race 34 extends axially along the axis 46 between and to opposing axial sides 94 and 96 of the bearing 16 and its inner race 34. The inner race 34 extends radially from a radial inner side 98 of the bearing 16 and its inner race 34 to a radial outer side 100 of the inner race 34. The inner race 34 extends circumferentially about (e.g., completely around) the axis 46. The inner race 34 may thereby have a full-hoop (e.g., annular) geometry. The inner race 34 may include an (e.g., annular) outer groove 102, one or more inner lubricant channels 104 (one visible in FIG. 1) and one or more internal lubricant passages 106 (one visible in FIG. 1).

The race groove 102 is disposed at the inner race outer side 100. This race groove 102 projects radially (in a radial inward direction towards the axis 46) into the inner race 34 from the inner race outer side 100. The race groove 102 extends axially within the inner race 34 along the axis 46. The race groove 102 extends circumferentially about (e.g., completely around) the axis 46 within the inner race 34.

The race channels 104 are arranged circumferentially about the axis 46 in an array; e.g., a circular array. Each of the race channels 104 extends axially through the inner race 34 between and to the inner race first side 94 and the inner race second side 96. Each of the race channels 104 projects radially (in the radial outward direction) into the inner race 34 from the inner race inner side 98. Each of the race channels 104 extends laterally (e.g., circumferentially or tangentially) within the inner race 34 between opposing lateral sides of the respective race channel 104.

The race passages 106 are arranged circumferentially about the axis 46 in an array; e.g., a circular array. Each of the race passages 106 is configured as a through-hole which extends radially through the inner race 34. Each race passage 106 of FIG. 1, for example, extends radially (in the radial outward direction) from a respective one of the race channels 104 to the race groove 102. The race passages 106 may thereby fluidly couple the race channels 104 to the race groove 102.

The bearing 16 may be configured as a rolling element bearing. The bearing 16 of FIG. 1, for example, also includes an outer race 108 and a plurality of rolling elements 110 (one visible in FIG. 1) arranged circumferentially about the axis 46 and the inner race 34 in an array; e.g., a circular array. Briefly, the outer race 108 is fixedly mounted to the stationary structure 12 and circumscribes the inner race 34 as well as an array of the rolling elements 110. The rolling elements 110 may be configured as ball bearing elements or alternatively roller bearing elements. Each rolling element 110 of FIG. 1 is seated within the race groove 102 of the inner race 34. Each rolling element 110 is disposed radially between and engages (e.g., contacts, rolls along, etc.) the inner race 34 and the outer race 108.

The engine components 32 and 34 may be axially retained and rotatably fixed to the engine shaft 24 in a stack along the outer mounting region 54. The bearing 16 and its inner race 34, for example, are mounted on the engine shaft 24 and its outer mounting region 54 axially adjacent the shaft shoulder 44. The inner race second side 96 of FIG. 1, for example, axially engages (e.g., is abutted axially against, contacts, etc.) the shoulder first engagement surface 66. With this arrangement, the race channels 104 are fluidly coupled to the shoulder passages 72 through the shoulder channel 70. The seal land 32 is mounted on the engine shaft 24 and its outer mounting region 54 axially adjacent the bearing 16 and its inner race 34. The seal land second side 80 of FIG. 1, for example, axially engages (e.g., is abutted axially against, contacts, etc.) the inner race first side 94. The stacked components 32 and 34 may be preloaded between the shaft shoulder 44 and another engine component 112; e.g., a stack nut, a spacer, etc. This preload is selected to clamp (e.g., grip, squeeze, etc.) the stacked components 32 and 34 sequentially along the engine shaft 24 and its outer mounting region 54 between the shaft shoulder 44 and the other engine component 112, and thereby fixing the stacked engine components 32 and 34 to the engine shaft 24.

Figure 2:
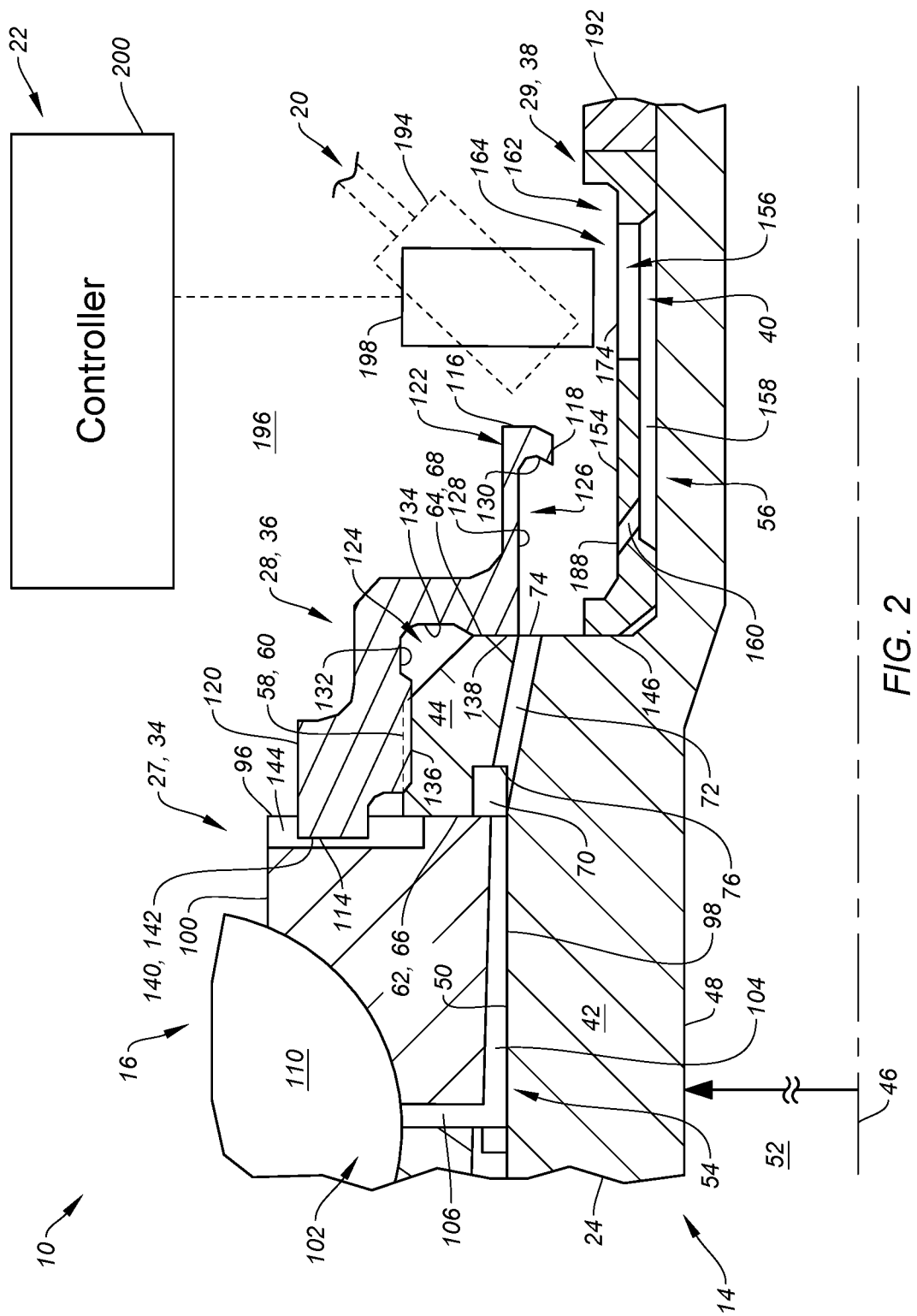
FIG. 2 is a partial side sectional illustration of the engine assembly at its lubricant scoops.

Referring to FIG. 2, the scoop body 36 extends axially along the axis 46 between and to opposing axial sides 114 and 116 of the scoop body 36. The scoop body 36 extends radially from a radial inner side 118 of the scoop body 36 to a radial outer side 120 of the scoop body 36. The scoop body 36 extends circumferentially about (e.g., completely around) the axis 46. The scoop body 36 may thereby have a full-hoop (e.g., annular) geometry. The scoop body 36 includes an axial lubricant scoop 122 and a counterbore 124.

The axial lubricant scoop 122 is configured to collect lubricant (e.g., engine oil) at the body second side 116 and/or the body inner side 118. The axial lubricant scoop 122 of FIG. 2, for example, includes a lubricant gutter 126. This gutter 126 projects radially (in the radial outward direction) into the scoop body 36 from the body inner side 118 to a distal radial outer side 128 of the gutter 126. The gutter 126 projects axially into the scoop body 36 to a distal axial end 130 of the gutter 126. The gutter 126 extends circumferentially about (e.g., completely around) the axis 46 within the scoop body 36. The gutter 126 may thereby have a full-hoop (e.g., annular) geometry.

The counterbore 124 is disposed at (or about) the body first side 114. The counterbore 124 projects radially (in the radial outward direction) into the scoop body 36 from the gutter outer side 128 to a radial outer side 132 of the counterbore 124. The counterbore 124 projects axially into the scoop body 36 to an axial end 134 of the counterbore 124. The counterbore 124 extends circumferentially about (e.g., completely around) the axis 46 within the scoop body 36. The counterbore 124 may thereby have a full-hoop (e.g., annular) geometry. Within this counterbore 124, the scoop body 36 of FIG. 2 includes an inner threaded region 136 and an (e.g., annular) engagement surface 138; e.g., a face surface, a contact surface, etc. The inner threaded region 136 is disposed at (or about) the counterbore outer side 132. The body engagement surface 138 is disposed at (or about) the counterbore axial end 134.

The scoop body 36 is mounted onto and fixedly attached to the engine shaft 24. The scoop body 36 of FIG. 2, for example, is threaded onto the engine shaft 24 and its shaft shoulder 44, where the inner threaded region 136 is mated with (e.g., threaded onto) the outer threaded region 60. The body engagement surface 138 axially engages (e.g., is abutted axially against, contacts, etc.) the shoulder second engagement surface 68. The scoop body 36 may also be torqued to provide a preload between the scoop body 36 and the shaft shoulder 44. With this arrangement, the scoop body 36 axially engages the engine shaft 24 and its shaft shoulder 44 at a discrete (e.g., radially inward) location from the threaded interface radially between the scoop body 36 and the shaft shoulder 44. Moreover, an axial side of the gutter 126 may also be formed by the shaft shoulder 44 and its shoulder second engagement surface 68. The gutter 126 is fluidly coupled with the shoulder passages 72 through their shoulder passage inlets 74.

While the scoop body 36 axially engages and may be preloaded against the engine shaft 24 and its shaft shoulder 44, the scoop body 36 may be axially disengaged from (e.g., may be axially separated from) the bearing 16 and its inner race 34. The scoop body 36 therefore is structurally outside of the stack of the engine components 32 and 34 (see also FIG. 1). However, it is contemplated the scoop body 36 may contact the bearing 16 and its inner race 34. An anti-rotation feature 140, for example, may be provided between the scoop body 36 and the inner race 34. The anti-rotation feature 140 of FIG. 2 includes a plurality of anti-rotation tabs 142 (one visible in FIG. 2) arranged circumferentially about the axis 46 in an array (e.g., a circular array) at the body first side 114. The scoop body 36 may thereby have a castellated rim at the body first side 114. Each of the tabs 142 may project axially partially into a respective recess 144 in the inner race 34. The anti-rotation feature 140 and its tabs 142 may thereby rotationally lock (e.g., fix) the scoop body 36 to the bearing 16 and its inner race 34 without transferring axial loads between the inner race 34 and the scoop body 36. With such an arrangement, the scoop body 36 may be mounted to the engine shaft 24 before the inner race 34. Of course, it is contemplated other techniques may also or alternatively be used for rotationally fixing (e.g., preventing backing off of) the scoop body 36.

Figure 3:
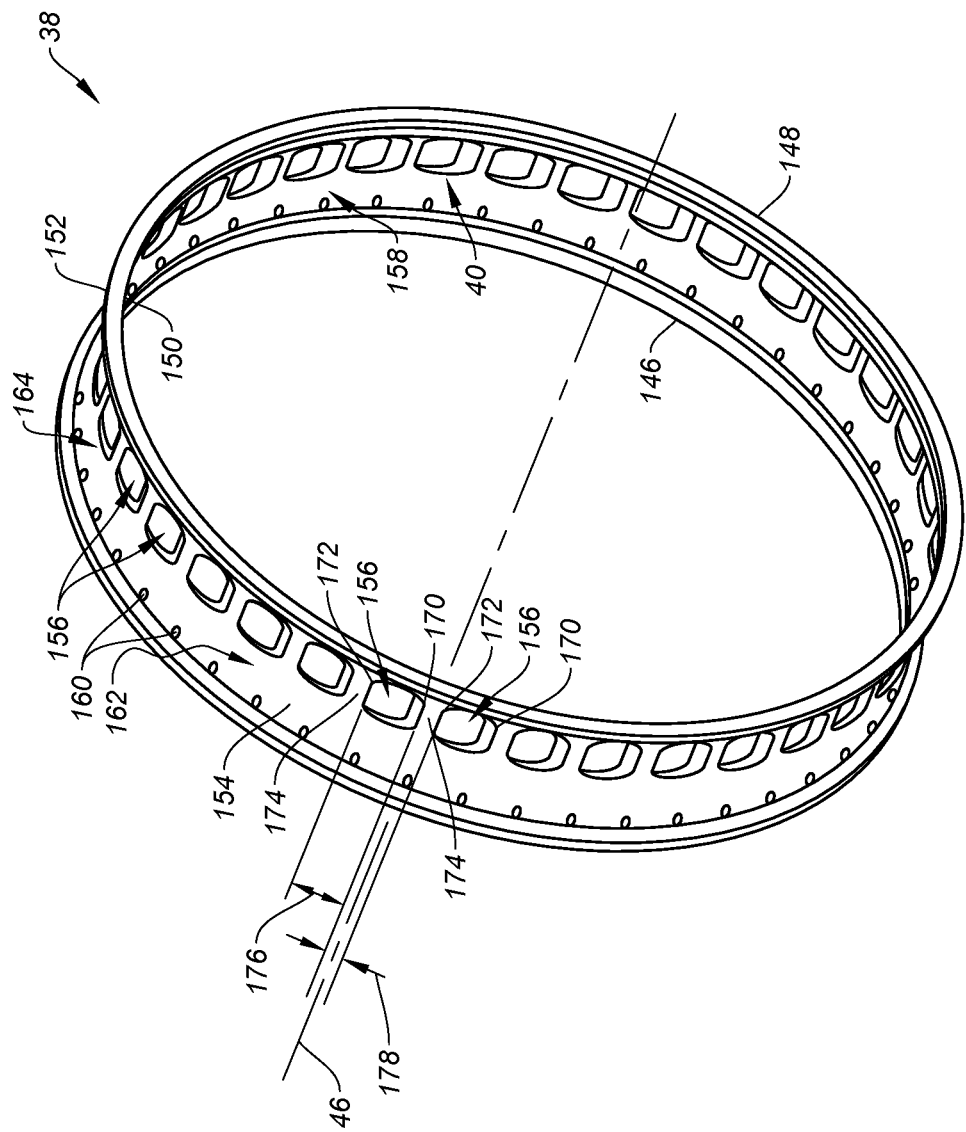
FIG. 3 is a perspective illustration of a phonic wheel with an integrated radial lubricant scoop.
Figure 4:
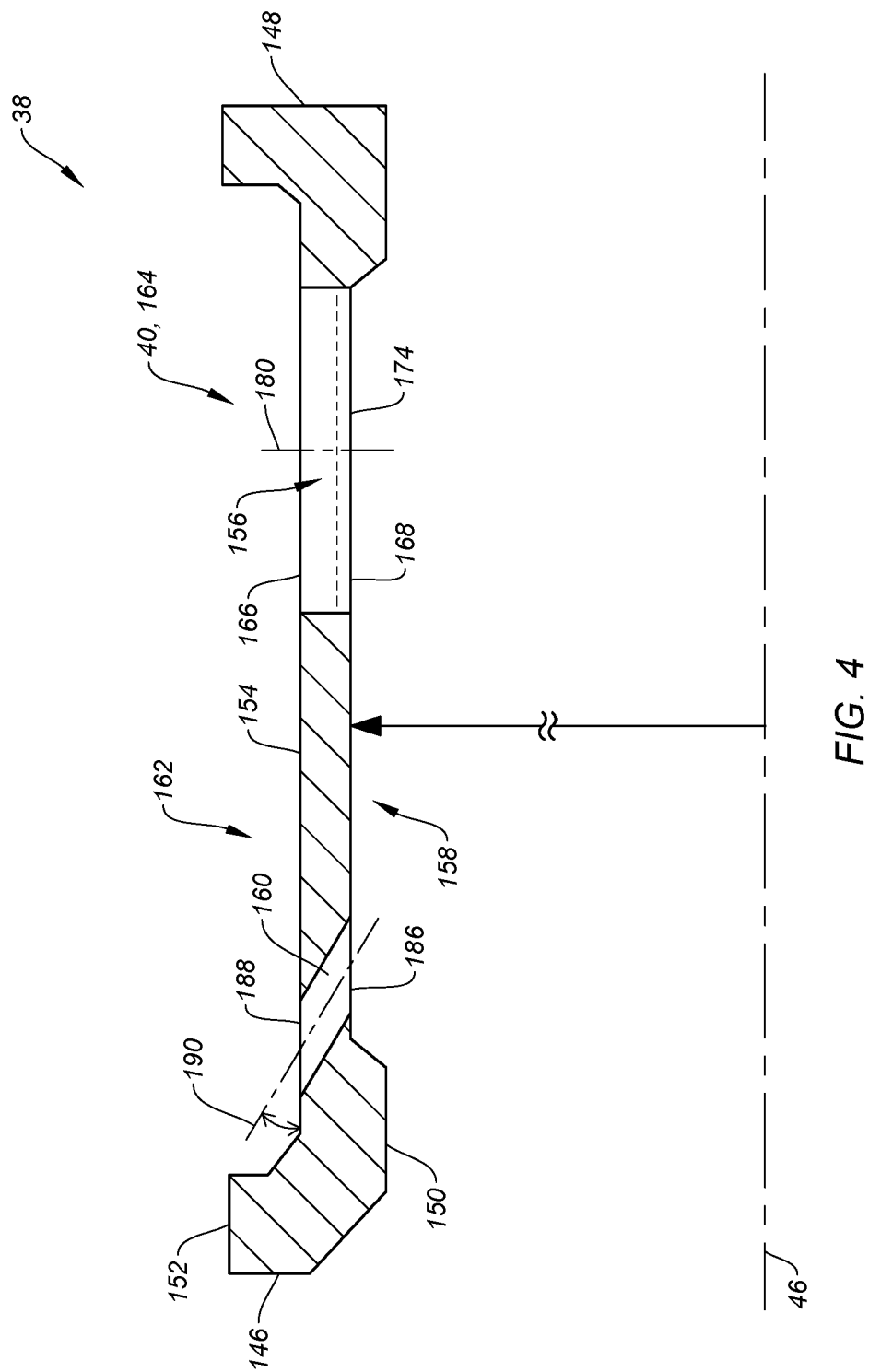
FIG. 4 is a partial side sectional illustration of the phonic wheel.

Referring to FIG. 3, the phonic wheel 38 extends axially along the axis 46 between and to opposing axial sides 146 and 148 of the phonic wheel 38. The phonic wheel 38 extends radially from a radial inner side 150 of the phonic wheel 38 to a radial outer side 152 of the phonic wheel 38. The phonic wheel 38 extends circumferentially about (e.g., completely around) the axis 46. The phonic wheel 38 may thereby have a full-hoop (e.g., annular) geometry. Referring to FIG. 4, the phonic wheel 38 includes an outer surface 154 and a plurality of apertures 156 (see also FIG. 3). The phonic wheel 38 of FIG. 4 also includes a lubricant inner channel 158 and one or more internal lubricant passages 160 (see also FIG. 3).

The outer surface 154 is a radial outward facing surface at (or about) the wheel outer side 152. This outer surface 154 extends axially along the axis 46 between opposing axial ends of the outer surface 154. The outer surface 154 extends circumferentially about (e.g., completely around) the axis 46. The outer surface 154 may thereby have a full-hoop geometry. The outer surface 154 of FIG. 3, for example, is configured as a cylindrical surface. The present disclosure, however, is not limited to such an exemplary outer surface configuration. The outer surface 154, for example, may alternatively be configured with a slight taper towards the wheel second side 146 as a frustoconical surface. An inner surface radially opposite the outer surface 154 may similarly also be configured with a slight taper towards the wheel second side 146 as a frustoconical surface.

Referring to FIG. 4, the outer surface 154 may form a radial inner side of an outer channel 162 in the phonic wheel 38. This wheel outer channel 162 projects radially (in the radial inward direction) into the phonic wheel 38 from the wheel outer side 152 to the outer surface 154. The wheel outer channel 162 of FIG. 4 extends axially within the phonic wheel 38 along the outer surface 154 and the axis 46. The wheel outer channel 162 extends circumferentially about (e.g., completely around) the axis 46. The present disclosure, however, is not limited to such an exemplary arrangement. For example, in other embodiments, the phonic wheel 38 may be configured without the wheel outer channel 162 and the outer surface 154 may at least partially or completely form the wheel outer side 152.

Referring to FIG. 3, the wheel apertures 156 are arranged circumferentially about the axis 46 in an array; e.g., a circular array. This array of the wheel apertures 156 is configured to provide the phonic wheel 38 and its outer surface 154 with a castellated region 164; e.g., a phonic wheel region. The array of the wheel apertures 156 of FIG. 3 is also configured to provide the phonic wheel 38 with its integrated radial lubricant scoop 40. Each wheel aperture 156 of FIG. 4, for example, extends radially through the phonic wheel 38 from an inlet 166 into the respective wheel aperture 156 to an outlet 168 from the respective wheel aperture 156. The aperture inlet 166 is disposed in and pierces (e.g., perforates) the outer surface 154. This aperture inlet 166 is fluidly coupled with the wheel outer channel 162. The aperture outlet 168 is disposed in a radial outer side of the wheel inner channel 158. This aperture outlet 168 is fluidly coupled with the wheel inner channel 158. Each wheel aperture 156 may thereby extend radially between and fluidly couple the wheel outer channel 162 and the wheel inner channel 158.

Each wheel aperture 156 extends axially within the phonic wheel 38 between opposing axial sides of the respective wheel aperture 156. Referring to FIG. 3, each wheel aperture 156 extends laterally within the phonic wheel 38 between opposing lateral sides 170 and 172 of the respective wheel aperture 156. With this arrangement, each circumferentially neighboring (e.g., adjacent) pair of the wheel apertures 156 are laterally separated by a respective portion of the phonic wheel 38—a phonic wheel tooth 174. The wheel apertures 156 are thereby circumferentially interspersed with the teeth 174, and the teeth 174 are circumferentially interspersed with the wheel apertures 156. Each wheel aperture 156 of FIG. 3 has a lateral width 176 measured between the respective lateral sides 170 and 172/the respective circumferentially neighboring pair of the teeth 174. This width 176 may be sized equal to or different (e.g., greater) than a lateral distance 178 between each circumferentially neighboring pair of the wheel apertures 156; e.g., a lateral width of a respective tooth 174.

Figure 5:
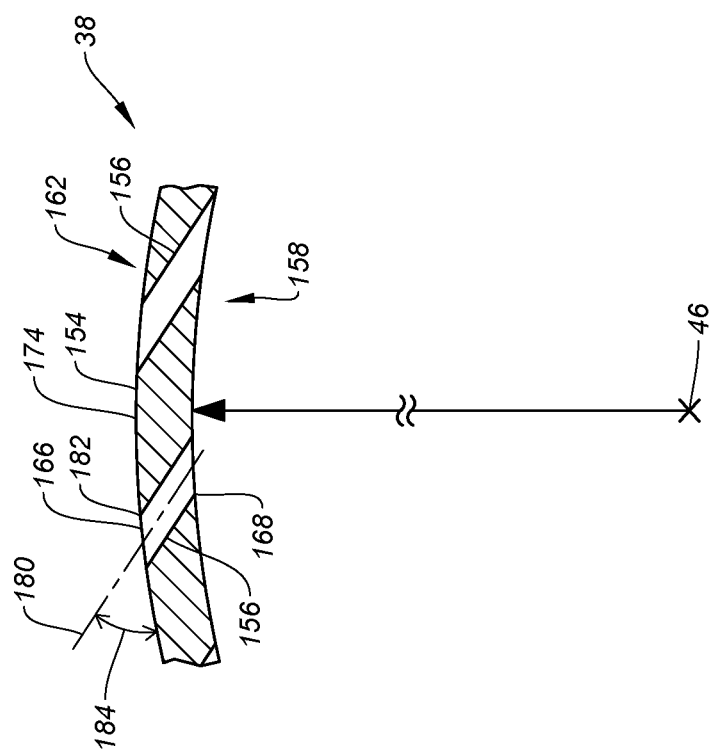
FIG. 5 is a partial cross-sectional illustration of the phonic wheel.

Referring to FIG. 5, each wheel aperture 156 extends along a centerline 180 of that respective wheel aperture 156 radially through the phonic wheel 38 and between its aperture inlet 166 and its aperture outlet 168. This aperture centerline 180 may be canted to the outer surface 154 so as to provide a leading edge 182 of each tooth 174 with a relatively sharp overhang. The aperture centerline 180 of FIG. 5, for example, is angularly offset from the outer surface 154 (at the respective aperture inlet 166) by an offset angle 184; e.g., an acute angle. With this arrangement, the leading edge 182 of each tooth 174 may be adapted to direct (e.g., scoop) any nearby lubricant within the wheel outer channel 162 radially into the respective wheel aperture 156.

Referring to FIG. 4, the wheel inner channel 158 is disposed at the wheel inner side 150. This wheel inner channel 158 projects radially (in the radial outward direction) into the phonic wheel 38 to the radial outer side of the wheel inner channel 158. The wheel inner channel 158 extends axially within the phonic wheel 38 along the axis 46 between opposing axial ends of the wheel inner channel 158. The wheel inner channel 158 extends circumferentially within the phonic wheel 38 about (e.g., completely around) the axis 46. The wheel inner channel 158 may thereby have a full-hoop (e.g., annular) geometry.

The wheel passages 160 are arranged circumferentially about the axis 46 in an array; e.g., a circular array. Each of these wheel passages 160 extends radially through the phonic wheel 38 from an inlet 186 into the respective wheel passage 160 to an outlet 188 from the respective wheel passage 160. The passage inlet 186 is disposed in the radial outer side of the wheel inner channel 158. This passage outlet 188 is fluidly coupled with the wheel inner channel 158. The passage outlet 188 is disposed in and pierces (e.g., perforates) the outer surface 154. This passage outlet 188 is fluidly coupled with the wheel outer channel 162. Each wheel passage 160 may thereby extend radially between and fluidly couple the wheel outer channel 162 and the wheel inner channel 158. Moreover, the wheel inner channel 158 fluidly couples the wheel apertures 156 to the wheel passages 160.

Each wheel passage 160 extends along a centerline 190 of that respective wheel passage 160 radially through the phonic wheel 38 and between its passage inlet 186 and its passage outlet 188. This passage centerline 190 may be canted to the outer surface 154 such that the respective wheel passage 160 is configured to direct lubricant out of its passage outlet 188 in a radial outward direction axially towards the wheel first side 146/axially away from the wheel second side 148.

The phonic wheel 38 is constructed from or otherwise includes ferromagnetic material. Examples of this ferromagnetic material include, but are not limited to, iron (Fe), nickel (Ni), cobalt (co) or alloys thereof such as stainless steel. The phonic wheel 38 may be formed as a monolithic body. Herein, the term "monolithic" may describe a component which is formed as a single unitary body. The phonic wheel 38 and its various features, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another. The present disclosure, however, is not limited to the foregoing exemplary manufacturing techniques.

Referring to FIG. 2, the phonic wheel 38 is mounted on the engine shaft 24 and its inner mounting region 56 axially adjacent the shaft shoulder 44. The wheel first side 146 of FIG. 2, for example, axially engages (e.g., is abutted axially against, contacts, etc.) the shoulder second engagement surface 68. This engagement between the phonic wheel 38 and the shaft shoulder 44 is radially between and spaced radially inward from the engagement between the scoop body 36 and the shaft shoulder 44. The phonic wheel 38 may be preloaded between the shaft shoulder 44 and another engine component 192; e.g., another stack nut, a spacer, a seal land, etc. This preload is selected to clamp (e.g., grip, squeeze, etc.) the phonic wheel 38 along the engine shaft 24 and its inner mounting region 56 between the shaft shoulder 44 and the other engine component 192, and thereby fixing the phonic wheel 38 to the engine shaft 24.

With the foregoing arrangement, the scoop body 36 and its axial lubricant scoop 122 are disposed radially outboard of and axially overlap a first side portion of the phonic wheel 38 and its outer surface 154. The gutter 126 of FIG. 2, for example, is disposed radially outboard of/radially opposite of the passage outlets 188. The wheel passages 160 may thereby be configured to direct lubricant into the gutter 126. The body second side 116, however, may be axially offset from the phonic wheel elements 40, 156 and 164 such that the scoop body 36 and its axial lubricant scoop 122 may not axially overlap those elements 40, 156 and 164.

The lubrication system 20 is configured to deliver lubricant (e.g., engine oil) to one or more of the engine components 32 and 34; see also FIG. 1. The lubrication system 20 of FIG. 2, for example, includes the lubricant elements 70, 72, 104, 106 and 126 and a lubricant injector 194 (e.g., a nozzle), which lubricant injector 194 is shown in dashed line form to indicate it is located at another circumferential location about the axis 46. The lubricant injector 194 of FIG. 2 is configured to direct (e.g., inject) the lubricant into a bearing compartment 196 towards the axial lubricant scoop 122. This lubricant may be collected in the gutter 126 and directed to the bearing 16 and its inner race 34 through the shoulder passages 72 and the shoulder channel 70. More particularly, the shoulder channel 70 may distribute the lubricant to the race channels 104. Each race channel 104 may direct at least some of that lubricant to the rolling elements 110 through the race passage 106. Each race channel 104 may also direct some of the lubricant to the seal land 32 (see FIG. 1) for cooling the seal land 32, for example, proximate the seal land surface 86.

While the lubricant injector 194 may direct the lubricant injected into the bearing compartment 196 towards the collection area below the axial lubricant scoop 122 and its gutter 126, some of the lubricant may flow to an area along the radial lubricant scoop 40. The radial lubricant scoop 40 and its apertures 156 may collect (e.g., scoop) this lubricant and direct it into the wheel inner channel 158. The wheel passages 160 may then direct the lubricant in the wheel inner channel 158 into the gutter 126 and towards the shoulder passages 72 for provision to the engine components 32 and 34 are described above. Ideally, however, a majority of the lubricant is collected by the axial lubricant scoop 122 without utilizing the radial lubricant scoop 40.

With the foregoing arrangement, the lubricant is directed towards a location axially to a side of the castellated region 164. The castellated region 164 and its teeth 174 are configured (e.g., shaped and positioned) within the bearing compartment 196 to reduce (e.g., minimize) viscous shear forces generated by the phonic wheel 38 within the lubricant injection and collection area. The windage generated by the castellated region 164 and its teeth 174 may thereby have little (e.g., adverse) effect on a trajectory of the lubricant injected by the lubricant injector 194, nor on collection of the lubricant by the axial lubricant scoop 122 and its gutter 126. Reducing lubricant exposure to such windage reduces lubricant churning within the bearing compartment 196 as well as increases likelihood that the lubricant will be delivered as designed without starving downstream engine components of the lubricant for lubrication and/or cooling.

The sensor system 22 is configured to measure at least one parameter of the rotating assembly 14. The sensor system 22 of FIG. 2, for example, includes the phonic wheel 38, a speed sensor 198 and a controller 200. The speed sensor 198 may be a magnetic pickup probe. A tip of the speed sensor 198 is disposed radially outboard of and adjacent the phonic wheel 38 and its castellated region 164. The speed sensor 198 is configured to measure fluctuations in a magnetic field which are induced by the phonic wheel 38 and its castellated region 164 during rotation of the rotating assembly 14. The speed sensor 198, for example, may output a voltage signal (e.g., a series of electric pulses) indicative of when each tooth 174 (or aperture) passes the tip of the speed sensor 198. The controller 200 receives the voltage signal and may process the voltage signal to determine a rotational velocity that the phonic wheel 38 and its castellated region 164 and, thus, the rotating assembly 14 and its engine shaft 24 are rotating about the axis 46. Of course, the controller 200 may also or alternatively process the voltage signal to determine various other engine parameters such as, but not limited to, shaft torque and the like.

In some embodiments, referring to FIG. 4, each wheel aperture 156 may be configured as a through-hole which extends radially through the phonic wheel 38. In other embodiments, however, it is contemplated one or more of the wheel apertures 156 may alternatively be configured as an indentation which projects partially radially into the phonic wheel 38 to a distal radial end (see dashed line). In such embodiments, the phonic wheel 38 may be configured without the wheel channel 158 and the wheel passages 160.

In some embodiments, the scoop body 36 may be mounted onto and fixedly attached to the engine shaft 24 as described above. In other embodiments, however, it is contemplated the scoop body 36 may alternatively be integrated as a part of the engine shaft 24 or another component attached to the engine shaft 30.

Figure 6:
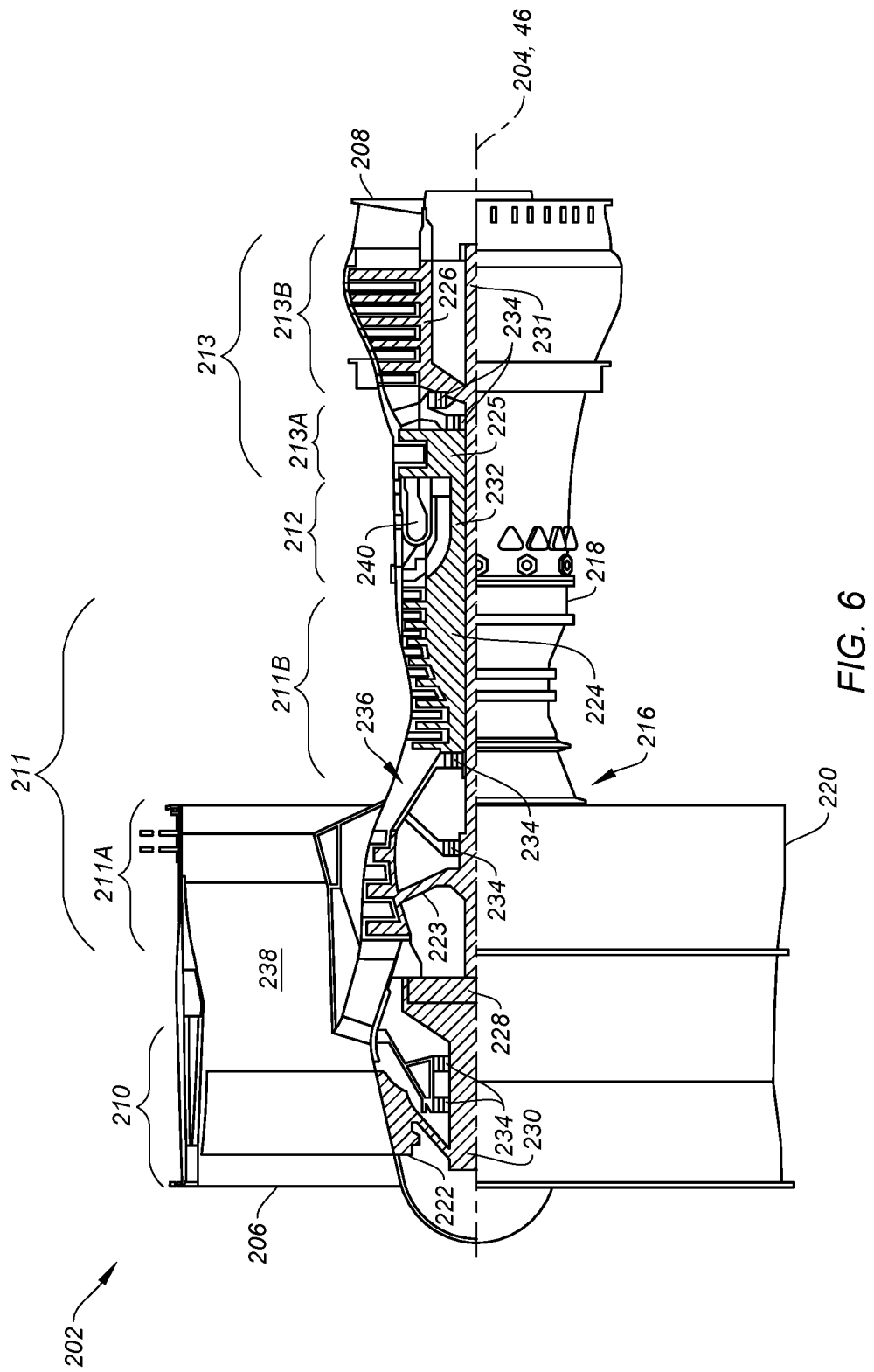
FIG. 6 is a side cutaway illustration of a gas turbine engine.

FIG. 6 illustrates an example of the turbine engine which may include the engine assembly 10. This turbine engine is configured as a turbofan gas turbine engine 202. The turbine engine 202 of FIG. 6 extends along an axial centerline 204 (e.g., the axis 46) between an upstream airflow inlet 206 and a downstream combustion products exhaust 208. The turbine engine 202 includes a fan section 210, a compressor section 211, a combustor section 212 and a turbine section 213. The compressor section 211 includes a low pressure compressor (LPC) section 211A and a high pressure compressor (HPC) section 211B. The turbine section 213 includes a high pressure turbine (HPT) section 213A and a low pressure turbine (LPT) section 213B.

The engine sections 210-213B are arranged sequentially along the axial centerline 204 within an engine housing 216. This engine housing 216 includes an inner case 218 (e.g., a core case) and an outer case 220 (e.g., a fan case). The inner case 218 may house one or more of the engine sections 211A-213B; e.g., a core of the turbine engine 202. The outer case 220 may house at least the fan section 210. The stationary structure 12 of FIGS. 1 and 2 may be connected to or configured as part of the engine housing 216.

Each of the engine sections 210, 211A, 211B, 213A and 213B includes a respective bladed rotor 222-226. Each of these bladed rotors 222-226 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 222 is connected to a geartrain 228, for example, through a fan shaft 230. The geartrain 228 and the LPC rotor 223 are connected to and driven by the LPT rotor 226 through a low speed shaft 231. The HPC rotor 224 is connected to and driven by the HPT rotor 225 through a high speed shaft 232. The engine shafts 230-232 are rotatably supported by a plurality of bearings 234; e.g., rolling element and/or thrust bearings. Each of these bearings 234 is connected to the engine housing 216 by at least one stationary structure. The bearing 16 of FIG. 1 may be configured as any one of these bearings 234, and the engine shaft 24 of FIG. 1 may be configured as any one of the engine shafts 230-232.

During operation, air enters the turbine engine 202 through the airflow inlet 206. This air is directed through the fan section 210 and into a core flowpath 236 and a bypass flowpath 238. The core flowpath 236 extends sequentially through the engine sections 211A-213B. The air within the core flowpath 236 may be referred to as "core air". The bypass flowpath 238 extends through a bypass duct, which bypasses the engine core. The air within the bypass flowpath 238 may be referred to as "bypass air".

The core air is compressed by the LPC rotor 223 and the HPC rotor 224 and directed into a combustion chamber 240 of a combustor in the combustor section 212. Fuel is injected into the combustion chamber 240 and mixed with the compressed core air to provide a fuel-air mixture. This fuel-air mixture is ignited and combustion products thereof flow through and sequentially cause the HPT rotor 225 and the LPT rotor 226 to rotate. The rotation of the HPT rotor 225 and the LPT rotor 226 respectively drive rotation of the HPC rotor 224 and the LPC rotor 223 and, thus, compression of the air received from a core airflow inlet. The rotation of the LPT rotor 226 also drives rotation of the fan rotor 222, where the rotation of the fan rotor 222 propels the bypass air through and out of the bypass flowpath 238. The propulsion of the bypass air may account for a majority of thrust generated by the turbine engine 202.

The engine assembly 10 may be included in various turbine engines other than the one described above. The engine assembly 10, for example, may be included in a geared turbine engine where a geartrain connects one or more shafts to one or more rotors in a fan section, a compressor section and/or any other engine section. Alternatively, the engine assembly 10 may be included in a turbine engine configured without a geartrain; e.g., a direct drive turbine engine. The engine assembly 10 may be included in a turbine engine with a single spool, with two spools (e.g., see FIG. 6), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. An assembly for a turbine engine, comprising:
a rotating assembly configured to rotate about an axis, the rotating assembly including an engine shaft, a phonic wheel and a lubricant scoop;

the phonic wheel mounted onto the engine shaft, the phonic wheel including an outer surface and a plurality of apertures arranged circumferentially about the axis, and each of the plurality of apertures projecting at least partially radially into the phonic wheel from the outer surface; and the lubricant scoop radially outboard of and axially overlapping the outer surface; and a sensor configured to measure fluctuations in a magnetic field induced by the phonic wheel during rotation of the rotating assembly about the axis.

2. The assembly of claim 1, further comprising:
a sensor system comprising the phonic wheel and the sensor;
the sensor system configured to determine a rotational velocity of the rotating assembly.

3. The assembly of claim 1, wherein
the plurality of apertures provide the outer surface with a castellated region; and
the castellated region is configured to induce the fluctuations in the magnetic field during the rotation of the rotating assembly about the axis.

4. The assembly of claim 3, wherein a tip of the sensor is disposed radially outboard of and adjacent the castellated region.

5. The assembly of claim 1, wherein the outer surface is a cylindrical outer surface.

6. The assembly of claim 1, wherein
each of the plurality of apertures has a lateral width; and
each circumferentially neighboring pair of the plurality of apertures are spaced apart by a lateral distance that is equal to or less than the lateral width.

7. The assembly of claim 1, wherein a first of the plurality of apertures comprises an indentation.

8. The assembly of claim 1, wherein a first of the plurality of apertures comprises a through-hole.

9. The assembly of claim 1, wherein
the lubricant scoop comprises an axial lubricant scoop; and
the plurality of apertures form a radial lubricant scoop in the phonic wheel.

10. The assembly of claim 1, wherein
the phonic wheel further includes a channel and a plurality of passages;
each of the plurality of apertures extends radially through the phonic wheel from the outer surface to the channel;
the channel is disposed at a radial inner side of the phonic wheel and fluidly couples the plurality of apertures to the plurality of passages; and
the plurality of passages are arranged circumferentially about the axis, and each of the plurality of passages extends radially out from the channel and through the phonic wheel.

11. The assembly of claim 1, wherein
the rotating assembly further includes a scoop body mounted with the engine shaft, and the scoop body comprises the lubricant scoop; and
the lubricant scoop comprises a gutter disposed at a radial inner side of the scoop body, and the gutter axially overlaps and is disposed radially opposite the outer surface.

12. The assembly of claim 11, wherein the scoop body is threaded onto the engine shaft.

13. The assembly of claim 11, wherein the engine shaft comprises a plurality of passages arranged circumferentially about the axis, and each of the plurality of passages extends axially into the engine shaft from the gutter.

14. The assembly of claim 13, wherein
the engine shaft further comprises a shoulder;
each of the plurality of passages extends axially through the shoulder; and
the scoop body is mounted onto the shoulder.

15. The assembly of claim 1, wherein
the rotating assembly further includes a scoop body mounted onto the engine shaft, the scoop body comprises the lubricant scoop, and the scoop body is axially abutted against an engagement surface of the engine shaft; and
the phonic wheel is axially abutted against the engagement surface of the engine shaft.

16. The assembly of claim 1, wherein the rotating assembly further comprises a bladed rotor connected to the engine shaft.

17. An assembly for a turbine engine, comprising:
a rotating assembly configured to rotate about an axis, the rotating assembly including an engine shaft, a phonic wheel and a lubricant scoop integrated into the phonic wheel;
the phonic wheel mounted onto the engine shaft, the phonic wheel including a plurality of apertures and an annular channel fluidly coupled with the plurality of apertures;
the plurality of apertures arranged circumferentially about the axis and forming the lubricant scoop and a castellated region of the phonic wheel, each of the plurality of apertures extending radially through the phonic wheel to the annular channel; and
the annular channel disposed at a radial inner side of the phonic wheel; and
a sensor configured to measure fluctuations in a magnetic field induced by the castellated region of the phonic wheel during rotation of the rotating assembly about the axis.

18. The assembly of claim 17, wherein
the phonic wheel further includes a plurality of passages arranged circumferentially about the axis, and each of the plurality of passages extends radially through the phonic wheel to the annular channel; and
the annular channel fluidly couples the plurality of apertures to the plurality of passages.

19. The assembly of claim 17, wherein
the lubricant scoop comprises a radial lubricant scoop;
the rotating assembly further includes an axial lubricant scoop radially outboard of and axially overlapping the phonic wheel; and
a lubricant collection area is formed by and radially between the phonic wheel and the axial lubricant scoop.

20. An assembly for a turbine engine, comprising:
a rotating assembly configured to rotate about an axis, the rotating assembly including an engine shaft, a phonic wheel and a lubricant scoop;
the phonic wheel mounted onto the engine shaft, the phonic wheel including a plurality of apertures arranged circumferentially about the axis, the plurality of apertures providing the phonic wheel with a castellated region, and each of the plurality of apertures extending radially through the phonic wheel; and
the lubricant scoop radially outboard of and axially overlapping the phonic wheel; and
a sensor configured to measure fluctuations in a magnetic field induced by the castellated region of the phonic wheel during rotation of the rotating assembly about the axis.

* * * * *